United States Patent
Holmes et al.

[11] Patent Number: 5,183,649
[45] Date of Patent: Feb. 2, 1993

[54] PRODUCTION OF PHOSPHORUS COMPOUNDS

[75] Inventors: William S. Holmes, Compton; Robert Marshall, Stourbridge, both of England

[73] Assignee: Albright & Wilson Ltd., Warley, England

[21] Appl. No.: 684,044

[22] Filed: Apr. 11, 1991

[30] Foreign Application Priority Data

Apr. 12, 1990 [GB] United Kingdom ............... 9008422

[51] Int. Cl.$^5$ ............................................. C01B 25/10
[52] U.S. Cl. ................................................. 423/300
[58] Field of Search ................................... 423/300

[56] References Cited

U.S. PATENT DOCUMENTS 3,406,013  10/1968  Müller-Schiedmayer et al. .................................. 423/300

FOREIGN PATENT DOCUMENTS 1033938  6/1966  United Kingdom .

OTHER PUBLICATIONS

Von Gunther Muller-Schiemayer et al, "The Preparation of Phosphorus Oxychloride and Polyphosphoryl Chlorides from the Elements Phosphorus, Chlorine and Oxygen", 1964, pp. 260-266, Zeitschrift fur anorganische und allgemeine Chemie, Band 333.

Primary Examiner—Wayne Langel
Attorney, Agent, or Firm—Frishauf, Holtz, Goodman & Woodward

[57] ABSTRACT

Chlorophosphorus compounds are produced in a loop apparatus wherein chlorine is added to a recycling medium comprising chlorophosphorus compound and elemental phosphorus.

23 Claims, 1 Drawing Sheet

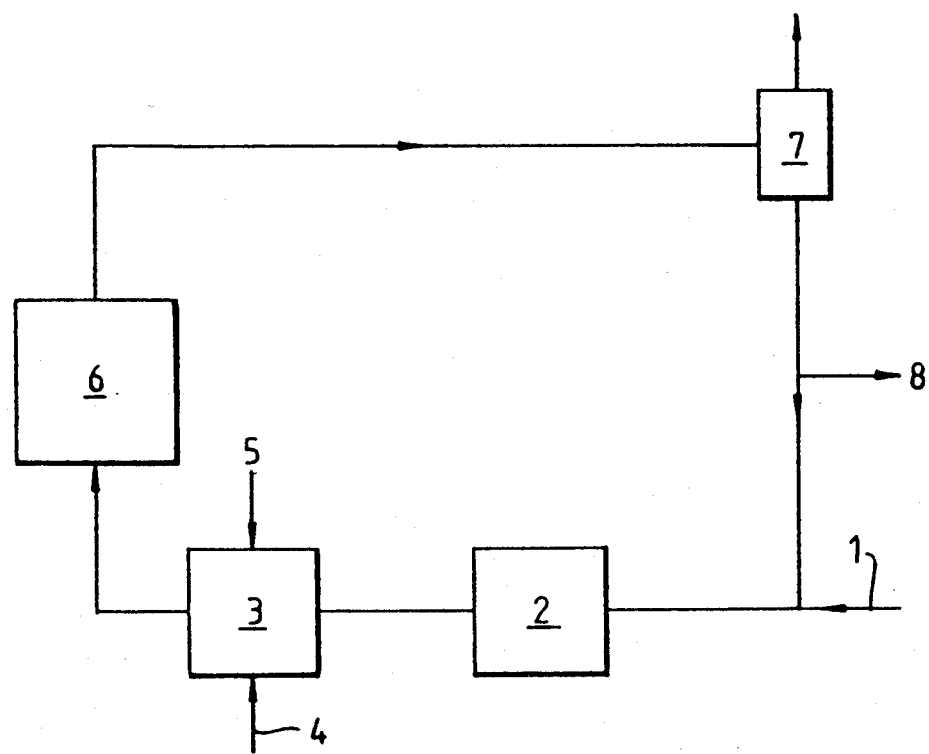

PRODUCTION OF PHOSPHORUS COMPOUNDS

The present invention concerns a process for producing chlorophosphorus compounds in particular phosphorus trichloride and oxychloride, from reactions involving phosphorus, chlorine and if needed oxygen.

The production of phosphorus oxychloride mixed with polyoxychlorides by reaction of phosphorus, oxygen and chlorine is described in BP 1033938 and Z. fur anorg and allgem Chemie 1964 Vol 333 pages 260–266. In these processes, yellow phosphorus, chlorine and an excess of oxygen are passed into the top of a reaction tower into which is also passed recycled phosphorus oxychloride product. The phosphorus, chlorine and oxygen react in a packed column fitted with a cooling jacket and a collecting vessel at its base. There is produced a liquid phosphorus oxychloride product mixture with a vapour phase consisting of the excess of oxygen and volatilised product. A portion of the liquid product is recycled from the collecting vessel to the top of the reactor, a portion is retained in the collecting vessel and the rest is distilled, with separation of the excess of oxygen. The heat of the reaction is removed via the cooling jacket of the column and by the distillation in the collecting vessel. All the chlorine may be added with the phosphorus but preferably it is added in two portions, one at the top and the other in the middle of the reactor. At all times there is an excess of oxygen and therefore a significant amount of vapour phase.

But this vapour phase itself gives rise to problems because some gaseous mixtures of phosphorus trichloride and oxygen can be explosive. Furthermore, the presence of oxygen in a large discrete volume of vapour phase means that the contact with the majority of the phosphorus chloride, which is in the liquid phase, is reduced and therefore the rate of reaction is slow.

We have now discovered how to increase the production rate without producing any significant amount of vapour phase.

The present invention provides a process for producing products comprising chlorophosphorus compounds, said process comprising (i) adding yellow phosphorus to a recycling liquid medium comprising said product to give a condensed phase mixture of phosphorus in said liquid medium, (ii) passing chlorine, or chlorine and oxygen with the atom ratio of oxygen:phosphorus being less than 1:1, into said mixture to give a reaction material, where said mixture and said reaction material are in a condition of turbulent flow at (a) the points of contact of mixture, chlorine and, if present, oxygen, and (b) thereafter in the reaction zone whereby a reaction material comprising chlorophosphorus compound and elemental phosphorus is produced, (iii) cooling said reaction material, and (iv) recycling at least a portion of said reaction material as liquid medium for mixing with more yellow phosphorus.

In the absence of the oxygen, the process produces phosphorus trichloride, while in its presence, the process produces a product comprising phosphorus oxychloride or a mixture thereof with phosphorus trichloride.

The process is performed in a loop apparatus having inlets for yellow phosphorus, chlorine, and oxygen if desired, outlet for the product, one or more mixers and heat exchangers as coolers and one or more pumps. There may be 2 or 3 mixers, the second and third ones being preferably in-line mixers such as helical and cross bar mixers. The loop apparatus also preferably has a gas separator in the loop.

The phosphorus may be added to the recycling liquid medium as a solid or liquid, but for ease of control of feeding the phosphorus, it is preferably added as a molten liquid. The addition may be continuous or discontinuous. When both chlorine and oxygen gases are used, they may be added separately, with the chlorine added to the mixture before or preferably at about the same time as the oxygen. Preferably there is always chlorine present when any oxygen is reacting. Advantageously the chlorine and oxygen are premixed in the desired proportions and the premix added to the condensed phase mixture.

In the process the overall atom ratio of Cl:P in the input feeds is at most 3:1, and in the production of phosphorus oxychloride is usually slightly less e.g. 2.7–2.95:1. The atom ratio of O:P is zero when phosphorus trichloride is prepared and is otherwise less than 1:1 e.g. 0.1–0.98:1 such as 0.3–0.5:1. The atom ratio of Cl:O is usually 3–10:1. The choice of the proportions depends on the proportion of phosphorus trichloride to phosphorus oxychloride in the product, the higher the proportion of the latter, the higher the proportion of oxygen to chlorine. Thus for a 50:50 phosphorus trichloride phosphorus oxychloride mixture, the atom ratio of Cl:O is usually about 6:1.

An essential feature of this invention is that the phosphorus, and chlorine (and, if present, oxygen) are contacted when the recycled mixture containing the phosphorus is in a condition of turbulent flow, preferably with an apparent Reynolds Number of at least 2,000, usually at least 100,000 and especially 100,000 to 500,000 or 1–10 million. The apparent Reynolds number is calculated on the assumption that there is no gas phase present.

Turbulence can be achieved with a variety of mixers, e.g. those described in "Chemical Engineers Handbook", Ed. R. H. Perry and C. H. Chilton, McGraw Hill Book Co., New York, 5th edition, 1973, Section 21, pages 4–8, such as jet mixers, orifice plate mixers, "Kenic" mixers, nozzle mixers and centrifugal pumps and mechanically agitated mixers, such as "Silverson" mixers (whether the rotors in the mixers are operated or not), centrifugal pumps and mixers such as described in British Patent Specification No. 1052976. In each case the input pipes for the chlorine (and, if present, oxygen) are positioned such that their ends are in a region of turbulence in the mixer.

On grounds of capital, operating and repair costs, the mixer is preferably a static one with no moving parts. Examples of such mixers are orifice plate, "Kenic", venturi and jet mixers, as well as arrangements in which the inlet pipe or pipes for the chlorine and/or oxygen and the pipes carrying the recycled mixture containing the phosphorus are so disposed that, with the aid of baffles, if necessary or desired, there is the necessary turbulent flow under the conditions of temperature, nature of the liquid medium and flow rates operating in the process. Especially important are orifice plate mixers, which comprise a plate disposed across the liquid flow with at least one axial orifice, through which the liquid medium passes, the act of passage causing production of turbulent flow in the orifice upstream and downstream of the orifice. Preferably one or both of the chlorine and/or oxygen (if present) is passed through a pipe whose exit is in the turbulent region in the vicinity of the orifice, whether upstream or downstream of the orifice, or in the orifice itself. The chlorine and/or oxygen may be passed into the turbulent region from a direction parallel with e.g. coaxial with the bulk direction of flow of the liquid or may be passed from a direction substantially normal to the bulk direction of flow. The inlet pipe for the chlorine and/or oxygen can pass through the orifice as shown in British Patent Specification No. 975914, or with the inlet pipe surrounded by the condensed phase mixture upstream of the orifice and the end of the inlet pipe in the orifice instead of passing through it. Alternatively, the inlet pipe can pass from outside the loop line carrying the condensed phase mixture directly into the turbulent region downstream of the orifice, usually normal to the bulk direction of flow of the condensed phase mixture.

Most preferably the mixer is a turbulent flow orifice plate mixer which comprises an orifice which is substantially perpendicular to the plate, and a port in the internal wall of the orifice, the condensed phase mixture flowing through the orifice and the chlorine and/or oxygen passing through the port. The orifice constitutes a bore through the plate with the port constituting a passage in the wall of the bore. The ratio of the diameter of the orifice to the thickness of the plate, i.e. the length of the orifice is usually at most 2:1, e.g. 1:1 to 1:50 preferably 1:1 to 1:20 and especially 1:1 to 1:10. It will be understood that references to a "plate" herein include a fabricated construction made up of two thin plates joined together, the space between them being such as to accommodate a feed pipe to the port. The "orifice" then takes the form of a short length of pipe between the two thin plates. If desired there may be more than one port, e.g. 2–4 ports in the internal wall or the orifice e.g. one for chlorine and one if needed for oxygen inputs. The duct or ducts leading the oxygen and/or chlorine to the port or ports in the wall of the orifice may be drilled through the thickness of the plate, conveniently in a radial direction. It is not, however, essential that the port be flush with the internal wall, and it is possible to introduce a pipe or collar projecting beyond the wall in a radial, upstream or downstream direction. Preferably the mixer comprises an integral plate in which an axial bore or orifice and at least one radial duct or port have been fabricated e.g. by drilling, the orifice having the port or ports in its internal wall. The plate may be of circular, square or rectangular cross section with the orifice preferably at its centre; the centre of the port is preferably about equally spaced from the ends of the orifice, e.g. at a distance of 40–60% of the length of the orifice, from the end of the orifice. The dimensions of the turbulent flow plate mixer should be such, in relation to the mass density of the condensed phase mixture suspension, its viscosity and linear velocity in the orifice, that the Reynolds number in the orifice is greater than the minimum for turbulent flow, for example to give the Reynolds number given above. The greater diameter of the orifice for the constant volume of fluid through the orifice the smaller the Reynolds number and the less the pressure drop across the plate, so that the choice of diameter is a compromise between the desire for a high Reynolds number giving maximum turbulence and avoidance of a high pressure drop requiring maximum power input. In general, the design will be a compromise of the conflicting requirements of high throughput and Reynolds number with a reasonable applied pump pressure on the one hand and a high pressure drop across the plate on the other. These turbulent flow orifice plates can be of simple construction and the conditions for successful operation of small scale processes can be scaled up for larger scale processes easily. These mixers are described in BP 1563995.

The turbulent flow is achieved by use of the mixers and also in the loop circuit through which the liquid flows there is a pump; the requirement for turbulent flow necessitates a pump operating at a high pumping rate. The turbulent flow occurs in the mixer and in the reaction zone wherever unreacted chlorine and/or oxygen contacts the phosphorus containing liquid medium and reacts with it. Most pumps and heat exchangers for cooling the reaction mixture keep turbulent a liquid fed there into a state of turbulent flow. Fixed pressure pumps, e.g. centrifugal pumps are preferred through any other type of pump capable of high pumping rate may be used. It is possible for the mixer to act as a pump, e.g. with the Silverson mixer with the rotor operating, but preferably the mixer and pump are separate. The recycle loop system also contains one or more heat exchangers as coolers, inlets for feedstocks and an outlet for the product. Preferably the cooler is between the mixers and the outlets in the direction of liquid flow. Advantageously the loop also contains a gas separator e.g. a cylindrical tube or cyclone located after the reaction zone to remove any residual gases though the amounts of these relative to the feed gases are very small e.g. less than 5% or less than 1% or especially less than 0.2%.

Thus preferably the process occurs in a recycle loop reactor through which is pumped the liquid medium and reaction material, the reactor having in the direction of flow of the reaction material and liquid medium, an inlet for phosphorus, a pump, a mixer giving turbulent flow into which chlorine and if needed oxygen are passed, a heat exchanger as cooler, a gas separator and an outlet for reaction material. The chlorine is passed into the loop continuously with the phosphorus, and if needed oxygen, being optionally added continuously or discontinuously. The process may be operated continuously with continuous input of at least some reactants and continuous removal or product before or after the cooling step. Alternatively, the process may be operated semi continuously without the removal of product until after additions of reactants has stopped and the reaction completed as in a progressive addition process. The process may also produce a small amount of poly (phosphorus oxychloride), e.g. in amount of 1–10% when oxygen is used, but the amount of this can be reduced by periodically reducing or stopping the oxygen flow.

The temperature of the mixture of phosphorus and liquid medium as it enters the mixer before reaction with chlorine and/or oxygen is primarily governed by the need by a reaction of adequate speed which usually requires a temperature of greater than 20° C. or especially at least 30° C. Advantageously the temperature is such that the elemental phosphorus in the condensed phase mixture is molten e.g. at above 45° C. The upper limit in the absence of any applied pressure is usually 80° C. when the product is phosphorus trichloride and 100° C. when the product comprises phosphorus oxychloride, though higher temperatures, e.g. up to 110° C. or above, may be used with progressively higher pressure being placed on the system if necessary to stop volatilization at the liquid temperature. Preferably the temperature of the medium entering the mixer is 30°–80° C., and especially 40°–70° C. while the temperature of the reaction material leaving the reaction zone is usually 50°-110° C., e.g. 80°-110° C.

The loop system is usually maintained with an external pressure of at least substantially atmospheric, e.g. up to 10 atmospheres and preferably about atmospheric pressure. In the process, the reaction involving phosphorus, chlorine (and, if present, oxygen) is usually performed in the substantial absence of any significant amount of vapour phase, the act of mixing in the turbulent flow suspension being such as to stop or at least inhibit formation of the vapour phase. Thus the reaction is preferably preformed in a continuous liquid phase (which may also contain solid) and with any vapour phase in the form of a disperse phase of small bubbles.

After the reaction has occurred, the reaction material is cooled, usually to a temperature about the same as the input temperature of the recycle mixture before reaction. The reaction is exothermic, the heat of reaction being absorbed in the bulk of the circulating liquid as a heat sink. The cooling is preferably such as to give a maximum temperature difference of the liquid in different parts of the loop of 80° C., preferably 50° C., especially 10°-50° C. or 10°-30° C. in the production of any product comprising 10% or more of phosphorus oxychloride and 1°-10° C. in the production of product comprising 90% or more of phosphorus trichloride. The cooling may take place in one or more stages with the reaction mixture being passed through one or more heat exchangers. Usually any portion of reaction material will be withdrawn as reaction product is removed after at least partial cooling of the reaction material, and then the remainder is mixed with fresh phosphorus to compensate for the phosphorus reacted and removed, and to bring the content of phosphorus in the material back to the value desired. Alternatively the reaction material may be cooled after the portion is withdrawn, the cooling occurring before or after the fresh phosphorus is added.

After the end of the reaction zone, and preferably before any product is removed from the system, the reaction material usually passed through a gas separator to remove any small amount of residual gases though the process gives rise to substantially complete absorption and reaction of the input reactant gases. The gas separator may be a cyclone, or a vessel or tube in which the degree of turbulence is reduced sufficient to allow any entrained gases to separate. Thus in the separator, there is a gas liquid interface at which the entrained bubbles break; above the interface may be passed an inert gas e.g. dry nitrogen.

In the preferred method of operating the continuous process the portion of the reaction mixture taken out of the system can constitute a tenth to a two thousandth of the weight of the remainder of the reaction material recycled i.e. a recycle ratio of 10:1 to 2000:1, preferably 40:1 to 1000:1, e.g. 100:1 to 700:1 but especially 40-100:1.

The amount of the phosphorus in the condensed phase mixture entering the mixer depends on the desired composition of the product removed from the system and the recycle ratio, but is usually 0.05-10% e.g. 0.05%-1%, while the content of poly (phosphorus oxychloride) (if any) may be up to 20% e.g. 1-10% by weight.

In a most preferred process, the process is carried out in a recycle loop reactor having in the direction of flow of recycled mixture and reaction material, an inlet for phosphorus, a pump, an orifice plate mixer with inlet for chlorine (and oxygen if needed added together or separately), preferably together in a mixer comprising a plate having an orifice, through which the mixture passes and which is substantially perpendicular to said plate and a port or ports for the chlorine (and if present oxygen) in the internal wall of the orifice, the ratio of the diameter of the orifice to the thickness of the plate being 1:1 to 1:10, one or more in-line mixers, a heat exchanger as cooler, a gas separator and an outlet for said reaction mixture, the reaction being carried out at a temperature of 30°-100° C., the Reynolds Number at the point of mixing being at least 100,000, and the recycle weight ratio of the reaction mixture removed to the recycled reminder being 40-1000:1.

The product produced by the process and removed by the loop either at the end of batch or continuously or continually during a continuous operation is a mixture comprising unreacted phosphorus and phosphorus trichloride, or a mixture thereof with phosphorus oxychloride, usually with only a small amount of poly phosphorus oxychloride in contrast to that of BP 1033938 which is a mixture of phosphorus oxychloride and poly phosphorus oxychloride and gaseous oxygen. The components of the product are separated outside the loop by fractional distillation to separate the phosphorus chloride or chlorides, the phosphorus and any poly phosphorus oxychlorides, the latter two in the still bottom being recycled to the loop for reuse if desired.

The process and apparatus are simple to construct, operate and use.

The process is preferably performed in a loop apparatus, as shown in the accompanying drawing which is a block diagram of the loop which has an input line 1, a pump 2, turbulent flow mixer 3, input lines 4 and 5 to mixer 3, a heat exchanger 6, a gas separator 7 and an output line 8.

In the operation of the loop a mixture of unreacted phosphorus and phosphorus chloride product (referred to hereafter as a "heel") is circulated round the loop by pump 2. Fresh molten phosphorus is passed into the loop from line 1 and the mixture of it and the heel is drawn through pump 2 and rendered turbulent, so that the mixture is turbulent at the point in mixer 3 where chlorine and oxygen enter the loop from lines 4 and 5 respectively, the reaction material produced being then pumped further round the loop through the exchanger 6. Any residual gases in the reaction material are separated in gas separator 7. A small portion of the reaction material is removed through line 8 as product and the remainder is recycled for contact with fresh phosphorus from line 1. Alternatively the small portion of the reaction material may be removed before passage through the heat exchanger. In a semi batch process no product is removed during the period of feeding the reactants.

The mixer is one which imparts turbulence to the liquid flowing through it at the point of introduction of the oxygen (if present) and chlorine and thereafter in the reaction zone. Various types of mixer have been described above but preferably the mixer is an orifice plate mixer with 1 or more radial ports. Advantageously between the mixer 3 and heat exchanger 6 are one or preferably two in line mixers (not shown).

The process is illustrated in the following Examples in which apparatus as described with reference to the accompanying drawing was used but in a semi continuous manner. In each Example the process was operated with continuous circulation of the contents of the loop, a single addition of elemental P and continuous addition of chlorine and if present oxygen; no product was removed, so the weight of the contents of the loop increased during the reaction. The mixer was an orifice plate mixer with 1 radial port (as shown in BP 1563995) through which chlorine or a mixture thereof with oxygen was passed while the loop contents passed through the orifice; the ratio of the diameter of the orifice to the thickness of the plate was 1:7. The gas separator was a cyclone with the effluent gas vented to the atmosphere so the process was operated under substantially no externally applied pressure. All percentages are by weight.

EXAMPLE 1

37 kg of a liquid containing 58.9% phosphorus oxychloride, 36.4% phosphorus trichloride, 4.3% poly (phosphorus oxychloride) and 0.4% elemental yellow phosphorus was pumped round the loop at a rate of 1500 l/hr (about 2300 kg/hr) at a temperature of about 55° C. To the circulating liquid was added 3.4 kg of molten yellow phosphorus, and then a premixture of 1.0 kg/hr of oxygen gas and 11.6 kg/hr of chlorine gas (a Cl:O atom ratio of 5:1). The gases were passed into the mixer for one hour, during which time the temperature of the liquid leaving the heat exchanger and entering the mixer was 66°-67° C. while that of the liquid leaving the mixer and entering the heat exchanger (hereinafter called the reaction zone) was 90°-91° C. The gas leaving the gas separator was analysed, and after 38 minutes was found to contain oxygen in amount of 0.02% (relative to the amount of input oxygen). After 1 hour the loop contained 53 kg of a product with the same analysis as at the start.

The Reynolds number of the liquid in the mixer was 183,000.

EXAMPLE 2

The process of Example 1 was repeated with the loop initially containing 37kg of a liquid of 63.6% phosphorus oxychloride, 30.4% phosphorus trichloride, 5.8% poly (phosphorus oxychloride) and 0.2% elemental yellow P. The initial temperature of the liquid, which was recycling at 1900 l/hr (2900 kg/hr) was about 55° C. 3.05 kg of extra elemental P were added while the chlorine and oxygen were added at the same rates as in Example 1. The temperatures were 49°-51° C. and 71°-72° C. outside and inside the reaction zone respectively. After 10 minutes, the effluent gas contained oxygen in amount of 0.01% of the input feed. After 52 minutes the loop contained about 51 kg of liquid of 62.5% phosphorus oxychloride, 32.8% phosphorus trichloride, 4.3% poly (phosphorus oxychloride) and 0.4% elemental P. The Reynolds number in the mixer was 231,000.

EXAMPLE 3

The process of Example 1 was repeated with the loop initially containing 37 kg of a liquid of 72.6% phosphorus oxychloride, 20.1% phosphorus trichloride, 6.6% poly (phosphorus oxychloride) and 1-2% elemental yellow P. The initial temperature of the liquid which was recycling at 2000/1 hr (3100 kg/hr) was about 55° C., 2.3 kg of extra elemental P were added with chlorine and oxygen premixed as before in amounts of 9.6 kg/hr and 1.2 kg/hr respectively (a Cl:O atom ratio of 3.5:1). The temperatures were 50°-52° C. and 62°-69° C. outside and inside the reaction zone respectively. After 19 minutes, the effluent gas contained oxygen in amount of 0.04% of the input oxygen feed. After one hour the loop contained about 50 kg of 73.5% phosphorus oxychloride, 18.1% phosphorus trichloride 8.2%, poly (phosphorus oxychloride) and 0.2% elemental P. The Reynolds number in the mixer was 244,000.

EXAMPLE 4

The process of Example 1 was repeated but without addition of oxygen and with the loop initially containing 32 kg of a liquid of 88.3% phosphorus oxychloride, 5.9% phosphorus trichloride, 5.4% poly (phosphorus oxychloride) and 0.5% elemental yellow P. The initial temperature of the liquid which was recycling at 1700 l/hr (2635 kg/hr), was about 55° C. 3 kg of extra elemental P were added and then chlorine was passed into the mixer at 3.5 kg/hr. The temperatures were 59°-60° C. and 64° C. outside and inside the reaction zone respectively. After 75 minutes the loop contained about 39.5 kg of 74.2% phosphorus oxychloride 18.7% phosphorus trichloride 2.5% poly phosphorus oxychloride and 4.3% elemental P, corresponding to production of about 5.5 kg of phosphorus trichloride. The Reynolds number in the mixer was 207,000.

We claim:

1. A process for the production of a chlorophosphorus compound selected from the group consisting of phosphorus trichloride and a mixture of phosphorus trichloride and phosphorus oxychloride, said process comprising:
   (i) recycling a liquid medium comprising said chlorophosphorus compound and adding yellow phosphorus thereto to form a condensed phase mixture of phosphorus in said liquid medium,
   (ii) inputting into said condensed phase mixture under conditions of highly-turbulent flow a gas selected from the group consisting of chlorine and a mixture of chlorine and oxygen, such that the atomic ratio of oxygen to phosphorus is less than 1:1 to form a reaction mixture, said highly-turbulent flow resulting in an apparent Reynolds number of at least 2000 and being at (a) the points of contact of said reaction mixture and said gas and (b) thereafter in a reaction zone, whereby a reaction material comprising said chlorophosphorus compound and elemental phosphorus is produced, wherein (1) the overall atomic ratio of inputted chlorine to added phosphorus is 3:1 or less and the atomic ratio of inputted oxygen to added phosphorus in the condensed phase mixture is zero to produce phosphorus trichloride, or (2) the atomic ratio of inputted oxygen to added phosphorus in the condensed phase mixture is 0.1:1 to 0.98:1 and the atomic ratio of inputted chlorine to inputted oxygen is 3:1 to 10.1 to produce a mixture of phosphorus oxychloride and phosphorus trichloride,
   (iii) cooling said reaction material and,
   (iv) recycling at least a portion of said reaction material to (i) as said liquid medium for mixing with additional yellow phosphorus.

2. The process of claim 1, wherein said chlorine and oxygen are premixed in the desired proportions and the premix is added to said condensed phase mixture.

3. The process of claim 1, wherein said apparent Reynolds Number is 100,000 to 500,000.

4. The process of claim 1 or claim 3, wherein the temperature at the point of mixing of said phosphorus, chlorine and oxygen, if present, is 20° C. to 100° C.

5. The process of claim 1 or claim 3, wherein the temperature at the point of mixing of said phosphorus and chlorine is 20° C. to 80° C.

6. The process of claim 1, wherein said process is performed in a continuous liquid phase, which may also contain solid, and with any vapour phase in the form of a disperse phase of small bubbles.

7. The process of claim 1, wherein the process is performed in a recycle loop reactor through which is pumped said liquid medium, and said reaction material, wherein said recycle loop reactor comprises, in the direction of flow of said reaction material and said liquid medium, an inlet for yellow phosphorus, a pump, a mixer giving turbulent flow into which said chlorine and, if needed, oxygen, are passed, one or more heat exchangers as coolers and an outlet for said reaction material.

8. The process of claim 7, wherein said mixer is an orifice plate mixer which comprises a plate disposed across the liquid flow with at least one axial orifice through which said liquid medium passes.

9. The process of claim 8, wherein said orifice is substantially perpendicular to said plate and the internal wall of said orifice contains at least one port, through which said chlorine and/or oxygen passes.

10. The process of claim 9, wherein the ratio of the diameter of said orifice to the thickness of said plate is from 1:1 to 1:10.

11. The process of claim 7 or claim 8 or claim 9 or claim 10, wherein said recycle loop reactor also comprises one or more in-line mixers.

12. The process of claim 7 or claim 8 or claim 9 or claim 10, wherein said pump is a fixed pressure pump.

13. The process of claim 7 or claim 8 or claim 9 or claim 10, wherein said coolers are located between said mixers and said outlet in the direction of liquid flow.

14. The process of claim 7 or claim 8 or claim 9 or claim 10, wherein said recycle loop reactor also comprises a gas separator.

15. The process of claim 14, wherein said gas separator is a cylindrical tube or cyclone located after said reaction zone.

16. The process of claim 7 or claim 8 or claim 9 or claim 10, wherein said process is operated continuously with continuous input of at least some reactants and continuous removal of product before or after said cooling step.

17. The process of claim 16, wherein the recycle weight ratio of the reaction mixture removed to the recycled remainder is from 10:1 to 2000:1.

18. The process of claim 17, wherein said recycle weight ratio is from 40.1 to 100:1.

19. The process of claim 1, wherein the apparent Reynolds Number is 1 million to 10 million.

20. The process of claim 1, wherein the condensed-phase mixture of phosphorus in said liquid medium entering step (ii) is at a temperature of 40° to 70° C. and the reaction material exiting step (ii) is at a temperature of 80° to 110° C.

21. The process of claim 1, wherein the cooling results in a maximum temperature difference of the liquid in the process of 80° C.

22. The process of claim 21, wherein the amount of phosphorus in the condensed phase mixture entering step (ii) is 0.05 to 10 weight %.

23. The process of claim 1, wherein the process is carried out in a recycle loop reactor; step (ii) is carried out at a temperature of 30° to 100° C.; the apparent Reynolds Number at the point of mixing the phosphorus, chlorine, and if present, oxygen, is at least 100,000; and the recycle ratio of the reaction mixture removed to the recycle remainder is 40–1000:1.

* * * * *